United States Patent
Galletti et al.

(10) Patent No.: US 9,605,127 B2
(45) Date of Patent: Mar. 28, 2017

(54) PROCESS FOR RECOVERING WASTES OF A POLYMERIC COMPOSITION INCLUDING A PEROXIDIC CROSSLINKING AGENT

(71) Applicant: PRYSMIAN S.P.A., Milan (IT)

(72) Inventors: Franco Galletti, Milan (IT); Vito Scrima, Milan (IT)

(73) Assignee: PRYSMIAN S.P.A, Milan (IT)

( * ) Notice: Subject to any disclaimer, the term of this patent is extended or adjusted under 35 U.S.C. 154(b) by 1 day.

(21) Appl. No.: 14/441,335

(22) PCT Filed: Nov. 14, 2012

(86) PCT No.: PCT/IB2012/056410
§ 371 (c)(1),
(2) Date: May 7, 2015

(87) PCT Pub. No.: WO2014/076520
PCT Pub. Date: May 22, 2014

(65) Prior Publication Data
US 2015/0284528 A1 Oct. 8, 2015

(51) Int. Cl.
*H01B 7/00* (2006.01)
*C08J 11/28* (2006.01)
(Continued)

(52) U.S. Cl.
CPC ........... *C08J 11/28* (2013.01); *C08J 11/06* (2013.01); *H01B 7/0045* (2013.01); *H01B 7/17* (2013.01);
(Continued)

(58) Field of Classification Search
USPC ........ 174/110–110 PM, 113 R, 120 R–122 R
See application file for complete search history.

(56) References Cited

U.S. PATENT DOCUMENTS 4,123,584 A 10/1978 Brewton
4,546,128 A * 10/1985 Nakajima ............... C08J 5/046
428/327

(Continued)

FOREIGN PATENT DOCUMENTS

EP 1 288 257 3/2003
EP 2 407 509 1/2012

(Continued)

OTHER PUBLICATIONS

ISO Standard 289/1; "Rubber; Unvulcanized, Determinations Using a Shearing-Disc Viscometer; Part 1: Determination of Mooney Viscosity", 6 pages, (2014).

(Continued)

*Primary Examiner* — William H Mayo, III
(74) *Attorney, Agent, or Firm* — Finnegan, Henderon, Farabow, Garrett & Dunner, L.L.P.

(57) ABSTRACT

A process for recovering wastes of a polymeric composition including at least one peroxide-curable polymer and at least one peroxidic crosslinking agent, which includes compounding the wastes with at least one antioxidant agent suitable for sulfur-vulcanized elastomeric compositions, at a temperature lower than the decomposition temperature of the at least one peroxide crosslinking agent. The compounding of the polymeric wastes with the antioxidant agent is carried out at a temperature lower than the decomposition temperature of the peroxide crosslinking agent, so as to avoid any premature activation of the crosslinking agent. The process is particularly suitable for compositions based on elastomeric polyolefins, more preferably for elastomeric ethylene copolymers such as ethylene-propylene copolymers (EPR) and ethylene-propylene-diene terpolymers (EPDM), which can be processed at relatively low tempera- (Continued)

tures, much lower than the decomposition temperatures of the most common peroxide crosslinking agents.

18 Claims, 1 Drawing Sheet

(51) Int. Cl.
    *C08J 11/06*     (2006.01)
    *H01B 7/17*     (2006.01)
    *C08K 5/00*     (2006.01)
    *C08K 5/14*     (2006.01)
    *H01B 3/44*     (2006.01)

(52) U.S. Cl.
    CPC ........ *C08J 2315/00* (2013.01); *C08J 2323/08* (2013.01); *C08J 2323/16* (2013.01); *C08K 5/005* (2013.01); *C08K 5/14* (2013.01); *C08L 2207/20* (2013.01); *H01B 3/441* (2013.01); *Y02W 30/701* (2015.05)

(56) References Cited

U.S. PATENT DOCUMENTS

| | | | |
|---|---|---|---|
| 5,869,591 A | | 2/1999 | McKay et al. |
| 6,525,105 B1* | | 2/2003 | Udagawa ................ C08J 11/18 423/449.2 |
| 6,777,453 B1* | | 8/2004 | Matsushita ............ B29B 17/00 521/41 |
| 2003/0032685 A1* | | 2/2003 | Wideman ................ B60C 1/00 521/41 |
| 2004/0048698 A1 | | 3/2004 | Kanemitsu et al. |
| 2006/0225615 A1* | | 10/2006 | Raman .................... C04B 20/12 106/482 |
| 2009/0221751 A1* | | 9/2009 | Hasse .................... C08K 5/549 525/102 |
| 2010/0029817 A1* | | 2/2010 | Hwang ................. C07F 7/1836 524/262 |
| 2012/0041130 A1 | | 2/2012 | Ye | |

FOREIGN PATENT DOCUMENTS

| JP | 06-220244 | 8/1994 |
|---|---|---|
| WO | WO 98/52197 | 11/1998 |

OTHER PUBLICATIONS

International Search Report from the European Patent Office for International Application No. PCT/IB2012/056410, mailing date Aug. 19, 2013.
Written Opinion of the International Searching Authority from the European Patent Office for International Application PCT/IB2012/056410, mailing date Aug. 19, 2013.
Gustafsson et al.; "Stabilization of Peroxide Crosslinked Polyethylene", Die Angewandte Makromolekulare Chemie, vol, 261-262, No. 1, pp. 93-99, (1998).

\* cited by examiner

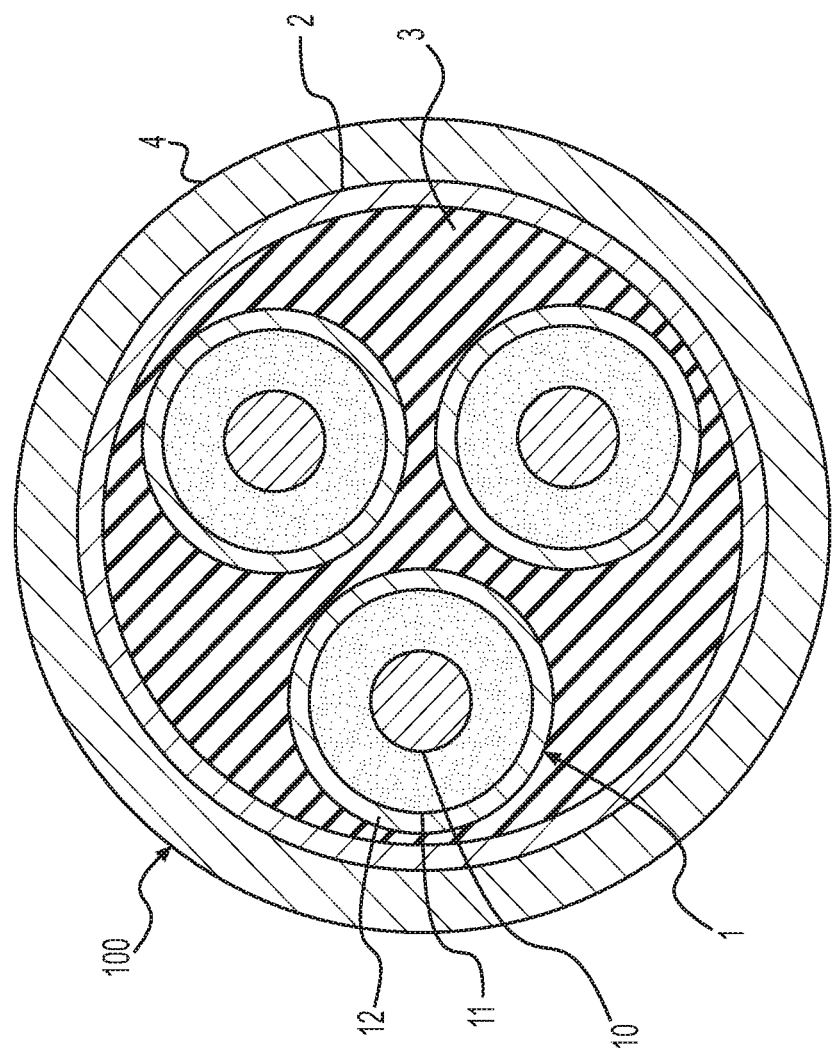

PROCESS FOR RECOVERING WASTES OF A POLYMERIC COMPOSITION INCLUDING A PEROXIDIC CROSSLINKING AGENT

CROSS REFERENCE TO RELATED APPLICATION

This application is a national phase application based on PCT/IB2012/056410, filed Nov. 14, 2012, the content of which is incorporated herein by reference.

BACKGROUND OF THE INVENTION

The present invention relates to a process for recovering wastes of a polymeric composition including a peroxidic crosslinking agent.

During the production of polymeric compositions including a peroxidic crosslinking agent—to be used, for instance, for the manufacturing of coating layers of electrical cables—remarkable amounts of wastes may result, e.g. because of formulation errors, contaminations or other undesired events that may modify composition and properties of the resulting polymeric material, making it unsuitable for the intended purpose. This is particularly critical in the case of polymeric compositions to be used for electrically insulating medium and/or high voltage electrical cables, wherein the insulating layer must be substantially devoid of any defects or impurities.

Polymeric wastes containing unreacted peroxidic crosslinking agent should be discarded following expensive national standard routes. It is environmentally preferable to recover such polymeric wastes, but the procedure poses several problems mainly because of the presence of the peroxidic crosslinking agent, which must be eliminated so as to avoid any undesired crosslinking of the composition during the subsequent processing of the recovered material. It is worthwhile to note that a direct recycling of the wastes to the production process of the composition is not feasible, since it is practically impossible to determine with sufficient precision the composition of the wastes, particularly as regards the peroxide content, a parameter that shall be known with high accuracy to carry out the process for manufacturing, for example, electrical cables in a reliable manner.

In patent application JP 62-20244 a method is disclosed for recycling an uncrosslinked crystalline polyolefin resin composition containing an organic peroxide by thermally decomposing the organic peroxide without causing the crosslinking of the composition by: (i) applying pressure to the composition so as to elevate the melting point of the crystalline polyolefin resin above the thermal decomposition temperature of the peroxide; and (ii) heating the composition to a temperature between the elevated melting point and the decomposition temperature.

U.S. Pat. No. 4,123,584 (Southwire Co.) relates to a process for recovering scrap thermosetting plastic compounds which comprises the steps of first hot-granulating the fresh scrap compound before it has time to fully cure, allowing the granules to cool, thereby arresting any further curing of the compound, then further processing the granules into a fine powder. The fine powder can be reused directly or blended with virgin material.

According to the Applicant, the above processes are substantially ineffective and difficult to carry out on an industrial scale, since they require a very accurate thermal control of the polymeric mass during the waste processing, a control that is difficult to achieve particularly when large polymeric masses are to be treated.

SUMMARY OF THE INVENTION

The Applicant has faced the problem of recovering wastes of a polymeric composition including unreacted peroxidic crosslinking agent by a method that can be carried out even on large amounts of wastes without requiring a complex multi-step process and avoiding any even partial crosslinking of the material, so as to allow a recycling of the recovered polymeric material to manufacture other articles, preferably other electrical cable elements different from the insulating covering.

The Applicant has now found that the above problem can be solved by adding, to the polymeric composition wastes, an antioxidant agent suitable for certain elastomeric compositions. In particular, it has surprisingly found that a class of antioxidant agents, generally defined as antioxidant agent suitable for sulfur-vulcanized elastomeric compositions, is effective to quench the peroxide crosslinking agent, so as to avoid any substantial crosslinking of the composition during processing of the same. The addition of said at least one antioxidant agent is carried out by compounding the polymeric wastes at a temperature lower than the decomposition temperature of the peroxide crosslinking agent, so as to avoid any premature activation of the crosslinking agent. This makes the process according to the present invention particularly suitable for compositions based on elastomeric polyolefins, more preferably for elastomeric ethylene copolymers such as ethylene-propylene copolymers (EPR) and ethylene-propylene-diene terpolymers (EPDM), which can be processed at relatively low temperatures, much lower than the decomposition temperatures of the most common peroxide crosslinking agents.

Moreover, the Applicant has found that the so recovered polymeric composition can be advantageously used in electric cable components such as filling material for electrical cable cores or the like, where the mechanical and electrical properties of such recovered polymeric composition is suitable. The resultant cable is less expensive than an equivalent cable comprising a common filling material because it contains waste material, but also because the Applicant found that the composition recovered by the present process can be added with a reduced amount of processing aids to be used as filling material.

Therefore, according to a first aspect, the present invention relates to a process for recovering wastes of a polymeric composition including at least one peroxide-curable polymer and at least one peroxidic crosslinking agent, which comprises compounding the wastes with at least one antioxidant agent suitable for sulfur-vulcanized elastomeric compositions, at a temperature lower than the decomposition temperature of the at least one peroxide crosslinking agent.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purposes of the present description and of the claims that follow, the term "phr" means the parts by weight of a given component (or mixture of components) of the polymeric composition per 100 parts by weight of the polymer(s) contained therein.

Preferably, the peroxide-curable polymer is an elastomeric polyolefin.

As to the antioxidant agent suitable for sulfur-vulcanized elastomeric compositions, it is preferably selected from primary antioxidants having reactive—OH and/or —NH groups, such as hindered phenols or secondary aromatic amines. With "primary antioxidant" it is meant an antioxidant which inhibits oxidation via a chain termination reaction.

Preferably, the antioxidant agent is selected from: secondary phenylamines and low molecular weight hindered phenols. With "low molecular weight", it is meant a molecular weight lower than 1000, preferably lower than 800. Secondary phenylamines are, for example, secondary phenylenediamines, diphenylamines, or derivatives thereof.

Secondary phenylenediamine suitable as antioxidants according to the present invention may be selected, for example, from: N-phenyl-N'-iso-propyl-p-phenylenediamine (IPPD), N-(1,3-dimethylbutyl)-N'-phenyl-p-phenylenediamine (6PPD), N,N'-bis-(1,4-dimethylpentyl)-p-phenylenediamine (77PD), N,N'-bis-(1-ethyl-3-methylpentyl)-p-phenylenediamine (DOPD), N,N'-diphenyl-p-phenylenediamine (DPPD), N,N'-ditolyl-p-phenylenediamine (DTPD), N,N'-di-β-naphthyl-p-phenylenediamine (DNPD), N,N'-bis-(1-methylheptyl)-p-phenylenediamine, N,N'-di-sec-butyl-p-phenylenediamine (44PD), N-phenyl-N'-cyclohexyl-p-phenylenediamine, N-phenyl-N'-1-methylheptyl-p-phenylenediamine, and mixtures thereof.

N-(1,3-dimethylbutyl)-N'-phenyl-p-phenylenediamine (6PPD) and N,N'-ditolyl-p-phenylenediamine (DTPD) are particularly preferred.

Diphenylamine derivatives suitable as antioxidants according to the present invention may be selected, for example, from: octylated diphenylamine (ODPA), styrenated diphenylamine (SDPA), and mixtures thereof.

Hindered phenols suitable as antioxidants according to the present invention may be selected, for example, from: 2,6-di-t-butyl-hydroxytoluene (BHT), 2,6-di-t-butyl-4-nonylphenol, 2,6-di-t-butyl-4-ethylphenol, 4-nonylphenol, 3-(2,3-di-t-butyl-4-hydroxyphenyl) propionic methyl ester, 3,5-di-t-butyl-4-hydroxyhydrocinnamic acid octadecyl ester, poly(dicyclopentadiene-co-p-cresol), and mixtures thereof.

Poly(dicyclopentadiene-co-p-cresol) and 2,6-di-t-butyl-hydroxytoluene (BHT) are particularly preferred.

Preferably, the antioxidant agent is mixed with the wastes to be recovered in an amount of from 0.2 to 10 phr, more preferably of from 0.5 to 5 phr.

The molar amount of added antioxidant agent should be substantial equal or in small excess with respect to the molar amount of peroxidic crosslinking agent present in the polymeric composition. In case unreacted amounts of antioxidant agent remain in the recovered polymeric composition, these are not detrimental for the use of such composition, quite the reverse they could improve the antioxidant characteristics thereof.

Preferably, the peroxide-curable polymer of the present invention may be selected from:
(i) diene elastomeric polymers, generally having a glass transition temperature (Tg) below 20° C., preferably from 0° C. to −90° C.;
(ii) chlorinated or chlorosulphonated polyethylenes;
(iii) elastomeric copolymers of at least one mono-olefin with at least one olefinic comonomer or a derivative thereof;
(iv) polyester rubbers;
(v) polyurethane rubbers.

As regards the diene elastomeric polymers (i), they may be of natural origin or may be obtained by solution polymerization, emulsion polymerization or gas-phase polymerization of at least one conjugated diolefin, optionally in admixture with at least one comonomer selected from monovinylarenes and/or polar comonomers in an amount of not more than 60% by weight.

The conjugated diolefin generally contains from 4 to 12, preferably from 4 to 8, carbon atoms, and optionally may contain at least one halogen atom, preferably chlorine or bromine. It may be selected preferably from the group comprising: 1,3-butadiene, isoprene, 2-chloro-1,3-butadiene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-butadiene, 2-chloro-1,3-butadiene and isoprene are particularly preferred.

Monovinylarenes which may be optionally used as comonomers generally contain from 8 to 20, preferably from 8 to 12, carbon atoms, and may be preferably selected from: styrene, 1-vinylnaphthalene, α-methylstyrene, 3-methylstyrene, 4-propylstyrene, 4-p-tolylstyrene, or mixtures thereof. Styrene is particularly preferred.

Polar comonomers may be preferably selected from: vinylpyridine, vinylquinoline, acrylic acid and alkylacrylic acid esters, nitriles or mixtures thereof, such as, for example, methyl acrylate, ethyl acrylate, methyl methacrylate, ethyl methacrylate, acrylonitrile, or mixtures thereof.

Preferably, the diene elastomeric polymer (i) may be selected from: cis-1,4-polyisoprene (natural or synthetic, preferably natural rubber), 3,4-polyisoprene, polybutadiene, polychloroprene, optionally halogenated isoprene/isobutene copolymers, 1,3-butadiene/acrilonitrile copolymers (NBR), styrene/1,3-butadiene copolymers (SBR), styrene/isoprene/1,3-butadiene copolymers, styrene/1,3-butadiene/acrylonitrile copolymers, or mixtures thereof. Particularly preferred are 1,3-butadiene/acrilonitrile copolymers (NBR), available e.g. under the trade name Krynac™ by Lanxess Deutschland GmbH.

As regards the chlorinated or chlorosulphonated polyethylenes (ii), they may obtained by chlorination or chlorosulphonation of polyethylene.

Chlorination of polyethylene is generally carried out by radical reaction of polyethylene with chlorine activated by means of UV radiation or by peroxides. Chlorine content in the final polymer is generally from 25% to 45% by weight. Commercial grades are available, e.g., under the tradename Tyrin™ by The Dow Chemical Co.

Chlorosulphonation of polyethylene is generally carried out by dissolving polyethylene in a chlorinated solvent and saturating said solution with chlorine and sulphur dioxide under UV radiation. Chlorine content in the final polymer is generally from 20% to 45% by weight, while sulphur content is generally from 0.8 to 2% by weight. Commercially grades are available, e.g., under the tradename Hypalon™ by Du Pont Performance Elastomers LLC.

As regards the elastomeric copolymers (iii), they may be obtained by copolymerization of at least one mono-olefin with at least one olefinic comonomer or a derivative thereof. The monoolefins may be selected from: ethylene and α-olefins generally containing from 3 to 12 carbon atoms, such as: propylene, 1-butene, 1-pentene, 1-hexene, 1-octene, or mixtures thereof. The following are preferred: copolymers of ethylene with an α-olefin, and optionally with a diene; isobutene homopolymers or copolymers thereof with small amounts of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Particularly preferred are: ethylene/propylene copolymers (EPR), ethylene/propylene/diene terpolymers (EPDM), polyisobutene, butyl rubbers, halobutyl rubbers, in particular chlorobutyl or bromobutyl rubber; or mixtures thereof. Preferably, the EPR/EPDM rubbers have the following monomer composition: 55-80% by weight, preferably 65-75% by weight, of ethylene; 20-45% by weight, preferably 25-35% by weight, of propylene; 0-10% by weight, preferably 0-5% by weight, of a diene (preferably 5-ethylene-2-norbornene).

Alternatively, the peroxide-curable polymer is a thermoplastic polyolefin such as:

(a) ethylene homopolymers or copolymers with at least one α-olefin, generally containing from 3 to 12 carbon atoms, such as: propylene, 1-butene, 1-pentene, 1-hexene, 1-octene, or mixtures thereof, particularly low density polyethylene (LDPE), linear low density polyethylene (LLDPE), medium density polyethylene (MDPE), high density polyethylene (HDPE);

(b) ethylene copolymers with at least one ethylenically unsaturated ester such as: ethylene/vinyl acetate copolymer (EVA), ethylene/methyl acrylate copolymer (EMA), ethylene/ethyl acrylate copolymer (EEA), ethylene/butyl acrylate copolymer (EBA); and mixtures thereof.

As regards the peroxidic crosslinking agent, it is preferably an organic peroxide. Preferably, the peroxidic crosslinking agent has a decomposition temperature equal to or greater than 90° C. more preferably from 105° C. to 145° C.

For example, the peroxidic crosslinking agent may be selected from: dicumyl peroxide, t-butyl cumyl peroxide, bis(t-butylperoxyisopropyl)benzene, bis(t-butylperoxy)2,5 dimethyl hexane, bis(t-butylperoxy)2,5 dimethyl hexyne, 2,4-dimethyl-2,5-di(t-butylperoxy) hexane, di-t-butyl peroxide, and mixtures thereof.

Preferably, the peroxidic crosslinking agent is present in the polymeric composition to be recovered in an amount of from 0.1 phr to 10 phr, more preferably from 0.5 to 5 phr.

The polymeric composition to be recovered may possibly contain other components, such as: fillers (e.g. carbon black, kaolin, calcium carbonate), antioxidants, anti-ageing agents, plasticizers, lubricants, flame-retardants, voltage stabilizers, water-tree retardants, etc.

The compounding of the wastes to be recovered with the antioxidant agent according to the present invention is carried out at a temperature lower than the decomposition temperature of the peroxide crosslinking agent, so as to avoid any premature crosslinking of the polymeric material during the processing of the same. Usually, the compounding temperature is lower than 150° C., preferably from 100° C. to 120° C.

The compounding can be carried out according to known techniques using a mixing apparatus commonly used for such polymeric materials, e.g.: open mixers; internal mixers having tangential rotors (Banbury) or interlocking rotors (Intermix); Ko-Kneader continuous mixers (Buss); co-rotating or counter-rotating twin-screw extruders.

To increase the processability of the wastes to be recovered, particularly when fillers are to be added to obtain properties suitable for the application to which the recovered polymeric material is intended, at least one processing aid is preferably added to the polymeric wastes, selected e.g. from: naphthenic oils, paraffinic oils, paraffinic waxes, stearic acid and salts or esters thereof. In this respect, it should be noted that the antioxidant agent added to the polymeric wastes can exert a certain lubricating action, therefore the amount of processing aid to be added can be significantly lower than that expected. Moreover, the polymeric wastes can already contain a certain amount of at least one processing aid, therefore in some circumstances no additional processing aid is requested. When necessary, the processing aid is preferably added in an amount of from 5 to 35 phr, more preferably from 8 to 25 phr.

As already indicated above, the so recovered polymeric composition can be advantageously used as filling material for electrical cable cores by extruding it within the space surrounding the insulated conductors, since it is endowed with suitable viscosity and does not crosslink during extrusion. To that purpose, the polymeric composition is usually supplemented with at least one filler, such as calcium carbonate, kaolin or the like.

According to another aspect, the present invention relates to a cable comprising at least one cable core and a component made of a recovered polymeric composition containing a product of reaction between a peroxidic crosslinking agent and an antioxidant agent suitable for sulfur-vulcanized elastomeric compositions.

The cable can be an electric, optic or optoelectric cable. The cable component made of the recovered polymeric composition according to the invention can be, for example, a filling material, a bedding or a dummy rod.

In particular, the cable of the invention comprises a protective layer surrounding at least one electric cable core and a filling material made of a recovered polymeric composition containing a product of reaction between a peroxidic crosslinking agent and an antioxidant agent suitable for sulfur-vulcanized elastomeric compositions.

Therefore, according to a further aspect, the present invention relates to the use of a polymeric composition obtained from the process for recovering wastes as described above, as filling material for electrical cable cores.

BRIEF DESCRIPTION OF THE DRAWING

Particularly, the polymeric composition obtained from the process according to the present invention can be used as filling material for a tripolar electrical cable as illustrated in FIG. 1 attached herewith (transversal cross section).

DETAILED DESCRIPTION OF THE INVENTION

With reference to FIG. 1, the tripolar electrical cable (100), particularly for medium voltage (MV) or high voltage (HV) applications, includes three cable cores (1), wound together and surrounded by two protective layers (2) and (4). In particular, the first protective layer (2) can be made from a metal tape (such as a steel tape) or by an expanded polymeric material, as disclosed for instance in patent application WO 98/52197. A second protective layer (4) is applied around and in contact with the first protective layer (2). The second protective layer (4) is the outermost external layer and is typically a polymeric sheath.

Each cable core (1) includes a metal conductor (10), an electrically shielding layer (11) and a metal shield (12). The electrically shielding layer (11) is constituted by an inner semiconductive layer, an electrically insulating layer and an outer semiconductive layer (for sake of simplicity not specifically shown in FIG. 1). The space surrounding the three cable cores (1) and delimited by the first protective layer (2) is filled by a polymeric filling material (3), which is applied by extrusion around the three wound cable cores (1).

The polymeric composition obtained from the process according to the present invention may be advantageously used as polymeric filling material (3), since it has a suitable viscosity to be extruded and to completely fill the voids between the wound cable cores, and it does not show any crosslinking during extrusion.

The following examples are provided to further illustrate the invention.

Examples 1-8

The process according to the present invention was applied to recover a waste of a polymeric composition typically used for electrical medium voltage cable insulations having the following composition:

| EPR rubber | 100 phr |
|---|---|
| Kaolin | 60 phr |
| Pb$_3$O$_4$ | 5 phr |
| ZnO | 5 phr |
| Dicumyl peroxide | 2.5 phr |

Different commercial antioxidant agents were used:

Irganox™ 1010 (Ciba): pentaerythritol tetrakis(3-(3,5-di-tert-butyl-4-hydroxyphenyl)propionate) (CAS Registry No. 98584-37-3), typically used as antioxidant for electrically insulating compositions, not for sulfur-vulcanized elastomeric compositions (MW=1178):

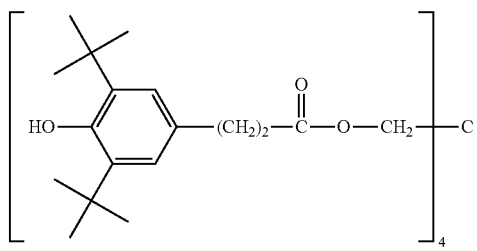

Lowinox™ CPL (Chemtura): poly(dicyclopentadiene-co-p-cresol) (synonym: phenol, 4-methyl-, reaction products with dicyclopentadiene and isobutene) (CAS Registry No. 68610-51-5), typically used as antioxidant for sulfur-vulcanized elastomeric compositions (MW=600-700):

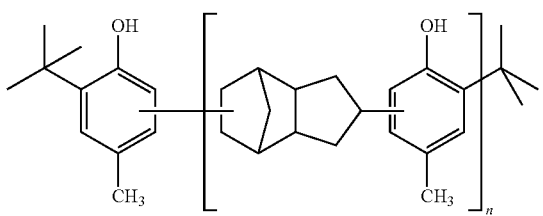

Octamine™ (Chemtura): octylated diphenylamine (CAS Registry No. 26603-23-6), typically used as antioxidant for sulfur-vulcanized elastomeric compositions:

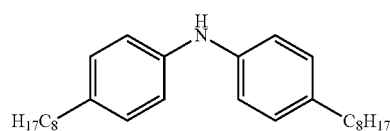

Vulkanox™ 4020 LG (Lanxess): N-(1,3-dimethylbutyl)-N'-phenyl-p-phenylenediamine (CAS Registry No. 793-24-8), typically used as antioxidant for sulfur-vulcanized elastomeric compositions:

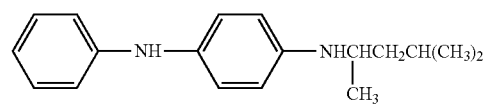

In each test, the polymeric waste was fed to a Banbury mixer in a granulated form together with the antioxidant in the predetermined amounts. The compounding was carried out with a mixer filling factor of 85%, a rotor speed of 50 rpm, a discharge temperature of the final composition of about 120° C.

The added amounts of antioxidants in the different tests are reported in Table 1 (as parts by weight).

TABLE 1

| | Example | | | | | | | |
|---|---|---|---|---|---|---|---|---|
| | 1* | 2* | 3 | 4 | 5 | 6 | 7 | 8 |
| Waste mix | 100 | 100 | 100 | 100 | 100 | 100 | 100 | 100 |
| Irganox ™ 1010 | 5.0 | 10.0 | — | — | — | — | — | — |
| Lowinox ™ CPL | — | — | 5.0 | 10.0 | — | — | — | — |
| Octamine ™ | — | — | — | — | 5.0 | 10.0 | — | — |
| Vulkanox ™ 4020 LG | — | — | — | — | — | — | 5.0 | 10.0 |

*comparative

The resulting polymeric compositions were subjected to rheometric analysis using a Moving Die Rheometer (MDR) from Monsanto, the tests being carried out at 180° C. for 15 minutes, with an oscillation frequency of 50 Hz and oscillation amplitude of ±3°.

The scorch time at 155° C. was determined by means of a scorch viscosimeter at 2'+22', according to a standard technique.

As reference, the MDR and scorch characteristics were determined also on the waste material as such, i.e. without adding any antioxidant (Ref. in Table 2). The results are reported in Table 2.

TABLE 2

| | Ref. | Example | | | | | | | |
| --- | --- | --- | --- | --- | --- | --- | --- | --- | --- |
| | | 1* | 2* | 3 | 4 | 5 | 6 | 7 | 8 |
| $M_L$ @ 180° C. (dN · m) | 0.43 | 0.31 | 0.16 | 0.28 | 0.23 | 0.27 | 0.18 | 0.22 | 0.16 |
| $M_H$ @ 180° C. (dN · m) | 10.22 | 2.11 | 0.67 | 0.86 | 0.35 | 0.88 | 0.32 | 0.30 | 0.19 |
| $t_{s2}$ @ 180° C. (min) | 0:54 | >24 | >24 | >24 | >24 | >24 | >24 | >24 | >24 |
| scorch $t_3$ @ 155° C. (min) | 4:58 | 12:36 | 13:02 | >24 | >24 | 13:25 | >24 | >24 | >24 |
| scorch $t_{10}$ @ 155° C. (min) | 6:57 | >24 | >24 | >24 | >24 | >24 | >24 | >24 | >24 |

*comparative
$M_L$ = minimum torque;
$M_H$ = maximum torque;
$t_{s2}$ = time period to increase the torque value of 2 dN · m from the minimum value $M_L$;
scorch $t_3$ = time necessary to increase the torque value of 3 dN · m from the minimum value $M_L$;
scorch $t_{10}$ = time necessary to increase the torque value of 10 dN · m from the minimum value $M_L$.

From the data reported in Table 2, it is apparent that, by adding the antioxidant according to the present invention to the polymeric waste, the organic peroxide present in the latter is almost completely quenched, as shown by the very low values of $M_H$ and the increased values of scorch time, with respect to the waste material as such.

The compositions 1* and 2* containing an antioxidant for electrically insulating compositions, not for sulfur-vulcanized elastomeric compositions, showed scorch values ($t_3$) unsuitable for a further use, and this is because such antioxidant is not capable of quenching the unreacted peroxide included in these compositions.

Examples 9-12

The process according to the present invention was applied on the same waste material of Examples 1-8 above, by compounding therein Vulkanox™ 4020 LG (Lanxess) in the amounts reported in Table 3 (parts by weight), by using the same mixing process described for Examples 1-8. The compositions were also added with relevant amounts of calcium carbonate as filler. Therefore, to improve processability, it was necessary to supplement plasticizers and/or processing aids, particularly a paraffinic oil, a paraffinic wax and stearic acid.

The compositions are reported in Table 3. The resulting polymeric compositions were subjected to rheometric analysis (MDR) according to the same method of Example 1-8. Moreover, Mooney ML(1+4) viscosity was measured at 100° C. according to ISO Standard 289/1.

The results are reported in Table 4.

TABLE 3

| | Example | | | |
| --- | --- | --- | --- | --- |
| | 9 | 10 | 11 | 12 |
| Waste mix | 100 | 100 | 100 | 100 |
| Vulkanox ™ 4020 LG | 3.0 | 6.0 | 3.0 | 6.0 |
| Omyacarb ™ 10 AV | 225 | 225 | 225 | 225 |
| Celtis ™ 933 | 15 | 15 | 7.5 | 7.5 |
| Riowax ™ 721 | 10 | 10 | 10 | 10 |
| Stearic acid | 1.5 | 1.5 | — | — |

Omyacarb ™ 10 AV (Omya) = calcium carbonate;
Celtis ™ 933 (ENI) = paraffinic oil;
Riowax ™ 721 (Lehmann & Voss & Co.): wax.

TABLE 4

| | Example | | | |
| --- | --- | --- | --- | --- |
| | 9 | 10 | 11 | 12 |
| $M_L$ @ 180° C. (dN · m) | 0.16 | 0.11 | 0.46 | 0.32 |
| $M_H$ @ 180° C. (dN · m) | 0.23 | 0.15 | 0.49 | 0.34 |
| $t_{s2}$ @ 180° C. (min) | >24 | >24 | >24 | >24 |
| Mooney ML(1 + 4) viscosity | 25 | 22.2 | 57.3 | 48.9 |
| Scorch $t_3$ @ 155° C. (min) | >24 | >24 | >24 | >24 |
| Scorch $t_{10}$ @ 155° C. (min) | >24 | >24 | >24 | >24 |

From Examples 9-12 it is apparent that the addition of the antioxidant agent according to the present invention allowed to remarkably reduce the amount of paraffinic oil and to eliminate stearic acid in the composition, which were added along with the paraffinic wax to improve processability which was inevitably reduced by the large amount of calcium carbonate filler incorporated into the composition. An increase of the Mooney viscosity was observed because of the reduction of the processing aids: it however remained within acceptable values for the subsequent processing of the polymeric composition.

The invention claimed is:

1. A process for recovering wastes of a polymeric composition comprising at least one peroxide-curable polymer and at least one peroxidic crosslinking agent, which comprises quenching the at least one peroxide crosslinking agent contained in the wastes by compounding the wastes with at least one antioxidant agent suitable for sulfur-vulcanized elastomeric compositions, at a temperature lower than the decomposition temperature of the at least one peroxide crosslinking agent.

2. The process according to claim 1, wherein the at least one antioxidant agent is selected from primary antioxidants having reactive —OH and/or —NH groups.

3. The process according to claim 2, wherein the at least one antioxidant agent is selected from secondary phenylamines and low molecular weight hindered phenols.

4. The process according to claim 3, wherein the at least one antioxidant agent is selected from: 2,6-di-t-butyl-hydroxytoluene (BHT), 2,6-di-t-butyl-4-nonylphenol, 2,6-di-t-butyl-4-ethylphenol, 4-nonylphenol, 3-(2,3-di-t-butyl-4-hydroxyphenyl) propionic methyl ester, 3,5-di-t-butyl-4-hydroxyhydrocinnamic acid octadecyl ester, poly(dicyclopentadiene-co-p-cresol), and mixtures thereof.

5. The process according to claim 3, wherein the secondary phenylamines are selected from: secondary phenylenediamines, diphenylamines, derivatives thereof, and mixtures thereof.

6. The process according to claim 5, wherein the secondary phenylenediamines are selected from: N-phenyl-N'-isopropyl-p-phenylenediamine (IPPD), N-(1,3-dimethylbutyl)-N'-phenyl-p-phenylenediamine (6PPD), N,N'-bis-(1,4-dimethylpentyl)-p-phenylenediamine (77PD), N,N'-bis-(1-ethyl-3-methylpentyl)-p-phenylenediamine (DOPD), N,N'-diphenyl-p-phenylenediamine (DPPD), N,N'-ditolyl-p-phenylenediamine (DTPD), N,N'-di-β-naphthyl-p-phenylenediamine (DNPD), N,N'-bis-(1-methylheptyl)-p-phenylenediamine, N,N'-di-sec-butyl-p-phenylenediamine (44PD), N-phenyl-N'-cyclohexyl-p-phenylenediamine, N-phenyl-N'-1-methylheptyl-p-phenylenediamine, and mixtures thereof.

7. The process according to claim 1, wherein the antioxidant agent is compounded with the wastes to be recovered in an amount of from 0.2 to 10 phr.

8. The process according to claim 7, wherein the antioxidant agent is compounded with the wastes to be recovered in an amount of from 0.5 to 5 phr.

9. The process according to claim 1, wherein the peroxide-curable polymer is an elastomeric polyolefin.

10. The process according to claim 1, wherein the at least one peroxide-curable polymer is a thermoplastic polyolefin.

11. The process according to claim 1, wherein the at least one peroxidic crosslinking agent has a decomposition temperature equal to or greater than 90° C.

12. The process according to claim 11, wherein the at least one peroxidic crosslinking agent has a decomposition temperature from 105° C. to 145° C.

13. The process according to claim 11, wherein the at least one peroxidic crosslinking agent is selected from: dicumyl peroxide, t-butyl cumyl peroxide, bis(t-butylperoxyisopropyl) benzene, bis(t-butylperoxy)2,5 dimethyl hexane, bis(t-butylperoxy)2,5 dimethyl hexyne, 2,4-dimethyl-2,5-di(t-butylperoxy) hexane, di-t-butyl peroxide, and mixtures thereof.

14. The process according to claim 1, wherein the compounding of the wastes with the at least one antioxidant agent is carried out at a temperature lower than 150° C.

15. The process according to claim 14, wherein the compounding of the wastes with the at least one antioxidant agent is carried out at a temperature from 100° C. to 120° C.

16. The process according to claim 1, wherein at least one processing aid is added to the polymeric wastes.

17. A cable comprising at least one cable core and a component made of a recovered polymeric composition comprising a product of the quenching reaction between a peroxidic crosslinking agent and an antioxidant agent suitable for sulfur-vulcanized elastomeric compositions.

18. A filling material for electrical cable cores comprising a polymeric composition obtained from the process for recovering wastes according to claim 1.

* * * * *